(12) United States Patent
Gery et al.

(10) Patent No.: US 7,180,531 B2
(45) Date of Patent: Feb. 20, 2007

(54) METHOD AND APPARATUS FOR ENABLING APPLICATION PROGRAM COMPATIBILITY WITH DISPLAY DEVICES HAVING IMPROVED PIXEL DENSITY

(75) Inventors: Ron O. Gery, Kirkland, WA (US); Jason W. Fuller, Bellevue, WA (US); Zeke Koch, Seattle, WA (US); Chee H. Chew, Redmond, WA (US); Keith C. Bentley, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 198 days.

(21) Appl. No.: 10/789,603

(22) Filed: Feb. 27, 2004

(65) Prior Publication Data
US 2005/0190203 A1 Sep. 1, 2005

(51) Int. Cl.
G09G 5/02 (2006.01)
(52) U.S. Cl. .................. 345/698; 345/699; 345/3.1; 345/3.3; 345/3.4
(58) Field of Classification Search ................ 345/698, 345/699, 3.1, 3.3, 3.4
See application file for complete search history.

(56) References Cited

U.S. PATENT DOCUMENTS

| | | | | |
|---|---|---|---|---|
| 4,990,902 A | * | 2/1991 | Zenda | 345/698 |
| 5,420,605 A | * | 5/1995 | Vouri et al. | 345/698 |
| 5,471,563 A | | 11/1995 | Dennis et al. | 395/114 |
| 5,579,509 A | * | 11/1996 | Furtney et al. | 703/27 |
| 5,612,715 A | * | 3/1997 | Karaki et al. | 345/698 |
| 5,740,456 A | | 4/1998 | Harel et al. | 395/780 |
| 5,778,403 A | | 7/1998 | Bangs | 707/527 |
| 6,044,408 A | | 3/2000 | Engstrom et al. | 709/302 |
| 6,278,434 B1 | | 8/2001 | Hill et al. | 345/127 |
| 6,282,327 B1 | | 8/2001 | Betrisey et al. | 382/299 |
| 6,377,262 B1 | | 4/2002 | Hitchcock et al. | 345/467 |
| 6,388,679 B1 | * | 5/2002 | Kluck et al. | 345/698 |
| 6,670,964 B1 | * | 12/2003 | Ward et al. | 345/660 |
| 6,982,729 B1 | * | 1/2006 | Lange et al. | 345/660 |
| 2002/0199180 A1 | * | 12/2002 | Donaldson et al. | 717/178 |
| 2003/0076340 A1 | * | 4/2003 | Hatori et al. | 345/699 |
| 2003/0154470 A1 | * | 8/2003 | Applin et al. | 717/170 |
| 2004/0080516 A1 | * | 4/2004 | Kurumisawa et al. | 345/596 |
| 2005/0052475 A1 | * | 3/2005 | Millman et al. | 345/690 |

* cited by examiner

*Primary Examiner*—Ulka Chauhan
*Assistant Examiner*—Daniel C. Washburn
(74) *Attorney, Agent, or Firm*—Merchant & Gould

(57) ABSTRACT

A method and apparatus are provided for enabling application program compatibility with display devices having an increased pixel density. According to one method, a call including one or more parameters is directed toward an application programming interface for performing a screen input or output function is received from an application program. In response to receiving the call, a determination is made as to whether the application program is configured for use with a display device having a lower pixel density or a display device having a higher pixel density. In response to determining that the application program is configured for use with a display device having a lower pixel density, the parameters are scaled for the higher pixel density display device and the application programming interface is called using the scaled parameters.

16 Claims, 5 Drawing Sheets

METHOD AND APPARATUS FOR ENABLING APPLICATION PROGRAM COMPATIBILITY WITH DISPLAY DEVICES HAVING IMPROVED PIXEL DENSITY

TECHNICAL FIELD

The invention generally relates to the field of backward compatibility for application programs and, more specifically, to the field of enabling backward compatibility for application programs with display devices having improved pixel densities.

BACKGROUND OF THE INVENTION

As handheld computing devices (also referred to herein as personal digital assistants ("PDAs")) have evolved, the computing capabilities of this class of devices has increased greatly. One hardware component of PDAs in particular that has seen great improvement is the display screen. Over time, both the resolution and pixel density of PDA display screens have been greatly increased. As utilized herein, the term "resolution" refers to the number of horizontal and vertical pixels that are accessible on the display screen. For instance, some PDAs utilize display screens having 240 horizontal pixels and 320 vertical pixels, while other PDAs utilize display screens having 480 horizontal pixels and 640 vertical pixels. As used herein, the term "pixel density" refers to the number of pixels that are accessible on the display screen within a specified unit of measurement. Typically, pixel density is referred to in dots (or pixels) per inch ("dpi"). For instance, some PDAs utilize display screens having 96 dpi, while other PDAs utilize display screens having an improved pixel density of 192 dpi.

The improved resolution and pixel density of modern PDAs has been a boon for users. The improved resolution and pixel density allow more information to be displayed on the screen and therefore allows for easier viewing of documents, Web pages, and for performing other functions. The improved resolution also improves clarity and readability. However, the improved resolution and pixel density has produced challenges for the programmers that write application programs for PDAs. These challenges have generally been caused by the fact that many PDA applications are written to assume that the display screen will have a particular pixel density. This problem is compounded by the fact that the operating system-provided application programming interfaces ("APIs") that application programs call to perform screen-related functions often take pixels as parameters. So, for example, if an application configured for use with a 96 dpi display screen draws an on-screen user interface button that is one-half inch wide, it would call an API to create a button that is 48 pixels in width. However, if the same application program is executed on a PDA with improved pixel density, 192 dpi for instance, the same 48 pixel wide button would only be one-quarter inch wide. Because application programs created prior to the introduction of devices having improved pixel density are unaware of the increased density, all of the user interface objects drawn by these programs will be displayed smaller than intended. Input operations where the screen is utilized as a touch sensitive device may also be misunderstood by such legacy application programs.

One solution to this problem is to require application programmers to re-program their applications to support the improved pixel density of newer PDAs. This, however, can be frustrating and time consuming for the programmer that has to actually re-code the application. This can also be frustrating for users that must wait until the application has been re-coded to use the application with a new device having increased pixel density. In some cases, a programmer may simply decide not to re-code the application program for the higher density displays. Users of the program would then be forced to migrate to another program in order to take advantage of higher density display screens.

Another solution to this problem is to create a new set of APIs for performing screen-related functions on higher resolution screens. This solution, however, is also undesirable because it does not allow legacy applications to utilize the higher density displays and also requires that programmers creating new high density-aware applications utilize an entirely new API. It is therefore desirable for legacy applications to be able to input and output correctly to an improved pixel density screen without rewriting the applications, to allow new high density-aware applications to use the same set of APIs for screen operations as legacy applications, and to enable this functionality without rewriting the APIs that perform screen input and output. It is with respect to these considerations and others that the various embodiments of the present invention have been made.

SUMMARY OF THE INVENTION

In accordance with the present invention, the above and other problems are solved by a method and apparatus for enabling application program compatibility with display devices having an increased pixel density. Utilizing the functionality provided by the invention, legacy applications can input and output correctly to an improved pixel density screen without modification. Moreover, applications that are high density display aware may utilize the same set of APIs for screen operations as legacy applications that are unaware of the improved pixel density. This functionality may be provided without requiring the APIs that perform screen input and output to be rewritten.

According to one aspect of the invention, a method is provided for enabling an application program configured for use with a display device having a lower pixel density to fully utilize a display device having a higher pixel density. According to the method, an application program executing on a PDA or other type of computing device may issue a request, or call, to an API to perform a screen input or output function, such as drawing to the screen or receiving input from a touch sensitive screen. The API call may include one or more parameters defining the operation to be performed and may be expressed using pixel units. For instance, a call may be made to an API to draw an on-screen user interface button that is 48 pixels wide.

When such a call is received, the call may be intercepted prior to reaching the intended API. A determination may then be made as to whether the application program is configured for use with a display device having a lower pixel density or a display device having a higher pixel density. This determination may be made by examining a property of the application program to determine a software development kit version number against which the application program was compiled. Application programs having version numbers greater than or equal to a predetermined number are assumed to support displays having a higher pixel density. Application programs having version numbers lower than the predetermined number are assumed to support only displays having a lower pixel density.

If the application program is configured for use with a display device having a lower pixel density, the parameters received with the API are scaled to the pixel density of the higher pixel density display device. For instance, if the application program is configured for a 96 dpi pixel density and the display device having a higher pixel density has a pixel density of 192 dpi, the parameters are doubled. A call is then made to the intended application program interface with the scaled parameters. If the application program is configured for use with a display device having a higher pixel density, the API call is passed directly to the API without scaling the parameters of the API function call. In this manner, application programs configured for use with a higher pixel density display screen will execute as intended.

If parameters are returned from an API call, such as when the API is utilized to receive stylus input from a touch-sensitive display, these parameters are scaled to the lower pixel density. By intercepting function calls to native APIs that perform screen I/O operations, scaling the parameters, and then calling the native APIs with the scaled parameters, legacy applications that do not include support for higher pixel density display screens can utilize the entire display screen of a high resolution device without requiring a rewrite of the application programs or the APIs.

According to another aspect of the invention, a computer system is provided that is configured to enable an application program created for use with a display device having a lower pixel density to fully utilize a display device having a higher pixel density. The computer system includes a central processing unit ("CPU"), a display device having a higher pixel density, and a memory operative to store one or more executable programs. In particular, the memory is operative to store an operating system for execution on the CPU, an application program configured for use with a display device having a lower pixel density, an API for performing I/O operations on the display device, and a translation layer.

The translation layer is operative to intercept calls made by the application program to the API. When such calls are received, the translation layer scales any parameters received with the call to the higher pixel density of the installed display screen. The translation layer then calls the intended API with the scaled parameters. If parameters are returned from an API call, such as when the API is utilized to receive input from a touch-sensitive display, the translation layer scales the parameter values to the lower pixel density utilized by the application program.

The translation layer may also be operative to determine whether the calling application program is configured for use with a display device having a lower pixel density or for use with a display device having a higher pixel density. If the application program is configured for use with a lower pixel density display, the translation layer scales the parameters in the manner described above. If, however, the translation layer determines that the application program has been created for use with a display having a higher pixel density, the translation layer calls the intended API without scaling the parameters. The determination as to whether a calling application program supports a lower or higher pixel density may be made be examining a property of the application program that indicates a version number of the software development kit against which the application was compiled.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
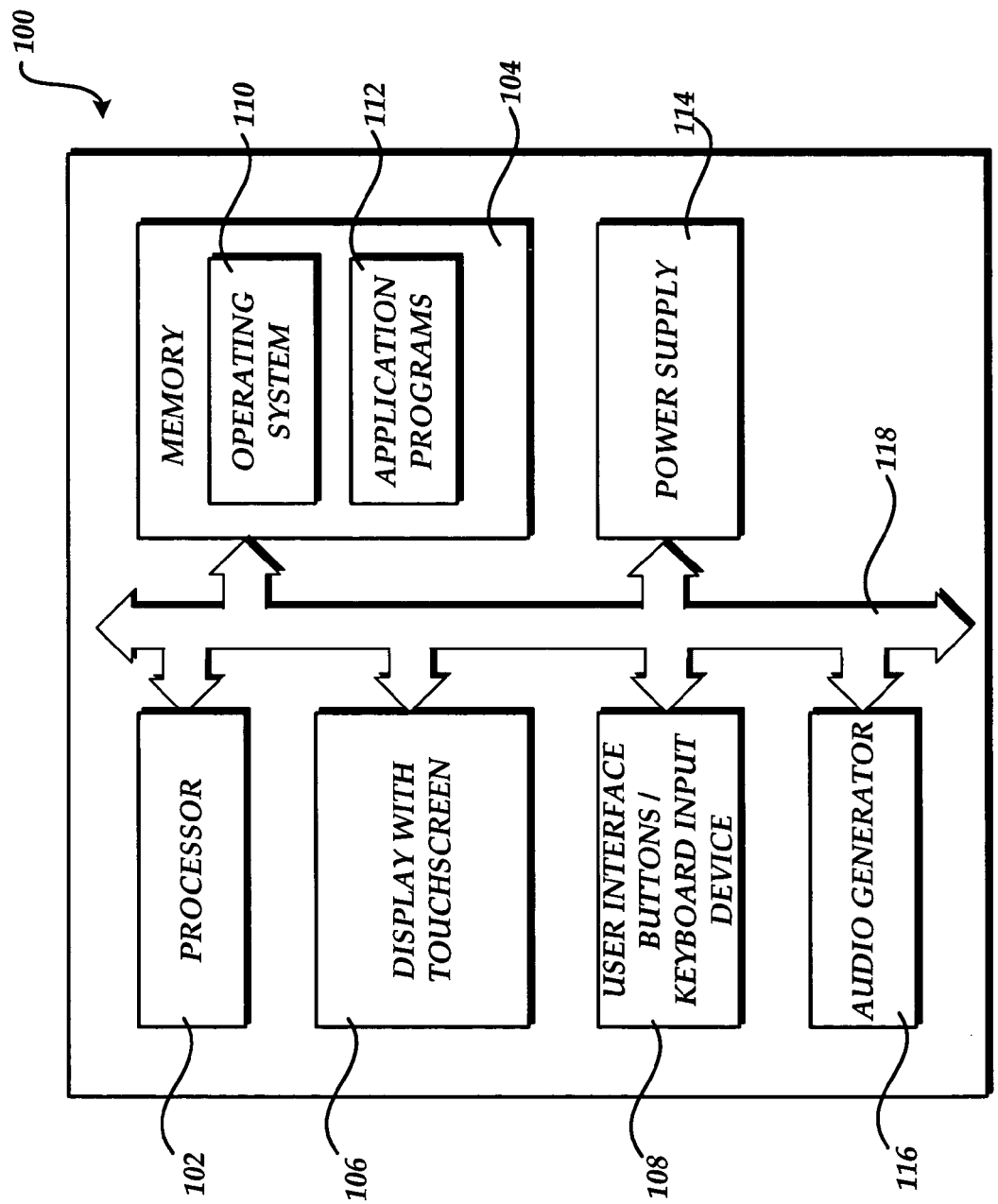
FIG. 1 is a computer system architecture diagram illustrating the architecture of a handheld computing device that provides an operating environment for embodiments of the present invention.

Referring now to the drawings, in which like numerals represent like elements, various aspects of the present invention will be described. FIG. 1 and the following discussion are intended to provide a brief, general description of a suitable computing environment in which the invention may be implemented. It should be understood that the computing environment in FIG. 1 is illustrative only and is not meant to limit the invention.

FIG. 1 describes a computing environment such as may be found in a handheld computing device, such as a PDA. However, it should be understood that the present invention is not limited to PDAs. The invention may be practiced with other computer system configurations, including multiprocessor systems, microprocessor-based or programmable consumer electronics, network PCs, minicomputers, mainframe computers, wireless telephones, pagers and the like. The invention may also be practiced in distributed computing environments where tasks are performed by remote processing devices that are linked through a communications network. In a distributed computing environment, program modules may be located in both local and remote memory storage devices.

Generally, program modules include routines, programs, components, data structures, and other types of structures that perform particular tasks or implement particular abstract data types. Moreover, those skilled in the art will appreciate that the invention may be practiced with other computer system configurations, including desktop computing systems, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a handheld computing device 100. The computing device 100 has a processor 102, a memory 104, a display 106, and a may include user interface buttons and/or a keyboard input device 108. The memory 104 generally includes both volatile memory (e.g., RAM) and non-volatile memory (e.g., ROM, PCMCIA cards, etc.). An operating system 110 is resident in the memory 104 and executes on the processor 102. The handheld computing device 100 includes an operating system 110 such as the "WINDOWS MOBILE 2003" operating system from MICROSOFT CORPORATION, the "PALM OS" operating system from PALMSOURCE, or another operating system suitable for operating a handheld or desktop computer.

One or more application programs 112 are loaded into the memory 104 and run on the operating system 110. Examples of applications include e-mail programs, scheduling programs, PIM (personal information management) programs, word processing programs, spreadsheet programs and so forth. Another example of an application program 112 is a web browser program module such as the "POCKET INTERNET EXPLORER" web browser application program from MICROSOFT CORPORATION or another web browser.

The handheld computing device 100 has a power supply 114, which is implemented as one or more batteries. The power supply 114 may further include an external power source that overrides or recharges the built-in batteries, such as an AC adapter or a powered docking cradle. The handheld computing device 100 may also include an audio generator 116 for generating audio output to be played back on a speaker contained within the handheld device 100. Each of the conventional components 102–116 of the handheld computing device 100 may be interconnected through a bus 118 for transmitting data and power signals.

As discussed briefly above, the handheld computing device 100 includes a display 106. The display 106 may comprise a backlit thin-film transistor liquid crystal display or other type of display suitable for operation in a handheld device. As also discussed briefly above, the display 106 may be equipped with touch screen capability. Through the use of a stylus or other pointing device, a user can provide input to the handheld device 100 by touching a desired portion of the display 106. The coordinates of the screen that the user touches are then returned to the operating system 110 for processing. It should be appreciated, therefore, that the display may provide both input and output capabilities to the handheld.

Figure 2B:
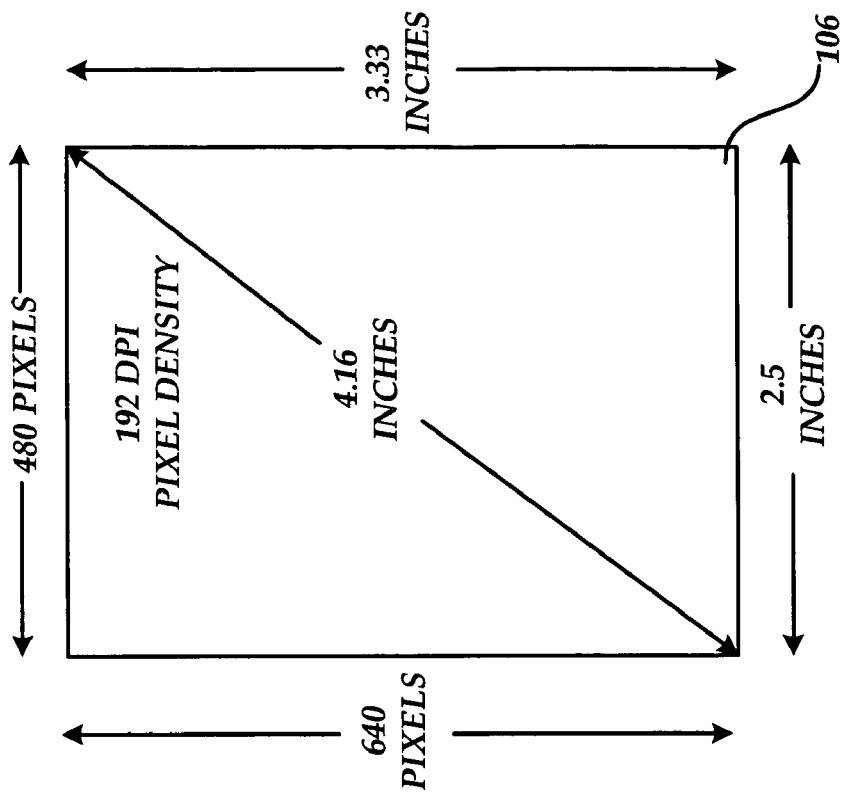
FIGS. 2A–2B are block diagrams illustrating the resolution and pixel density of two different display screens that may be utilized in the various embodiments of the invention.
Figure 2A:
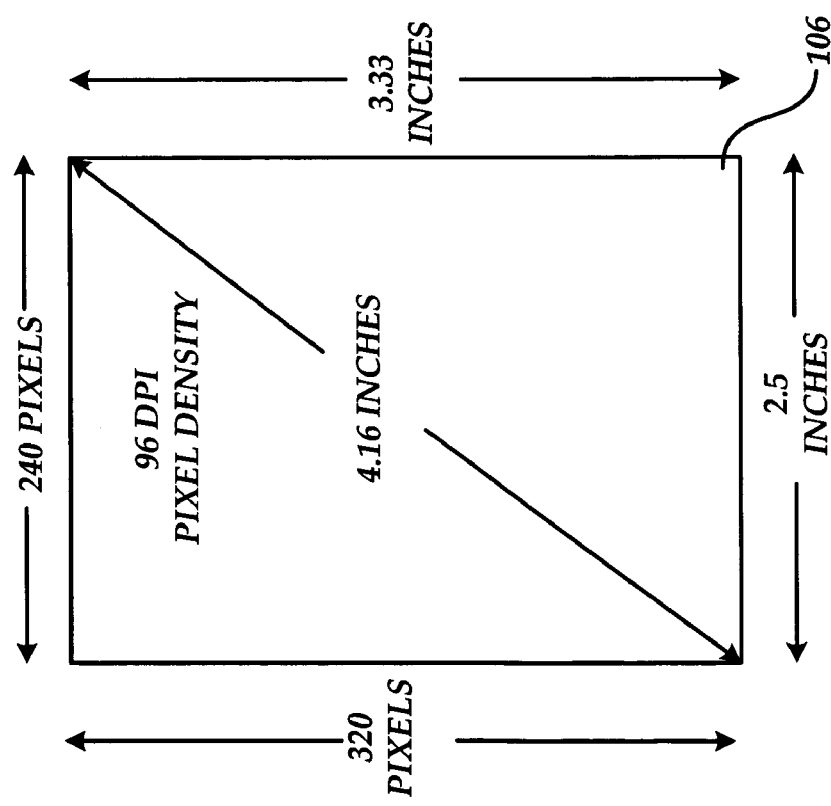

Referring now to FIGS. 2A and 2B, additional details regarding the display 106 utilized in the various embodiments of the invention will be described. As shown in FIGS. 2A and 2B, the display 106 utilized within the handheld may be configured with different pixel densities depending on the type of display panel utilized. For instance, as shown in FIG. 2A, a panel may be utilized for the display 106 that has a pixel resolution of 240 horizontal pixels by 320 vertical pixels. The dimensions of the display 106 illustrated in FIG. 2A may be 3.33 inches vertically and 2.5 inches horizontally. At these dimensions and pixel resolution, the pixel density of the display 106 shown in FIG. 2A is 96 dpi.

The display 106 illustrated in FIG. 2B has a higher pixel density than the display 106 illustrated in FIG. 2A. In particular, the display 106 has a resolution of 480 horizontal pixels by 640 vertical pixels, while the dimensions of the display 106 shown in FIG. 2B are the same as the display 106 shown in FIG. 2A. Accordingly, the pixel density of the display 106 shown in FIG. 2B is 192 dpi. It should be appreciated that displays having pixel densities of 96 dpi and 192 dpi are merely illustrative and that the embodiments of the invention may be utilized with displays having any pixel density.

Figure 3B:
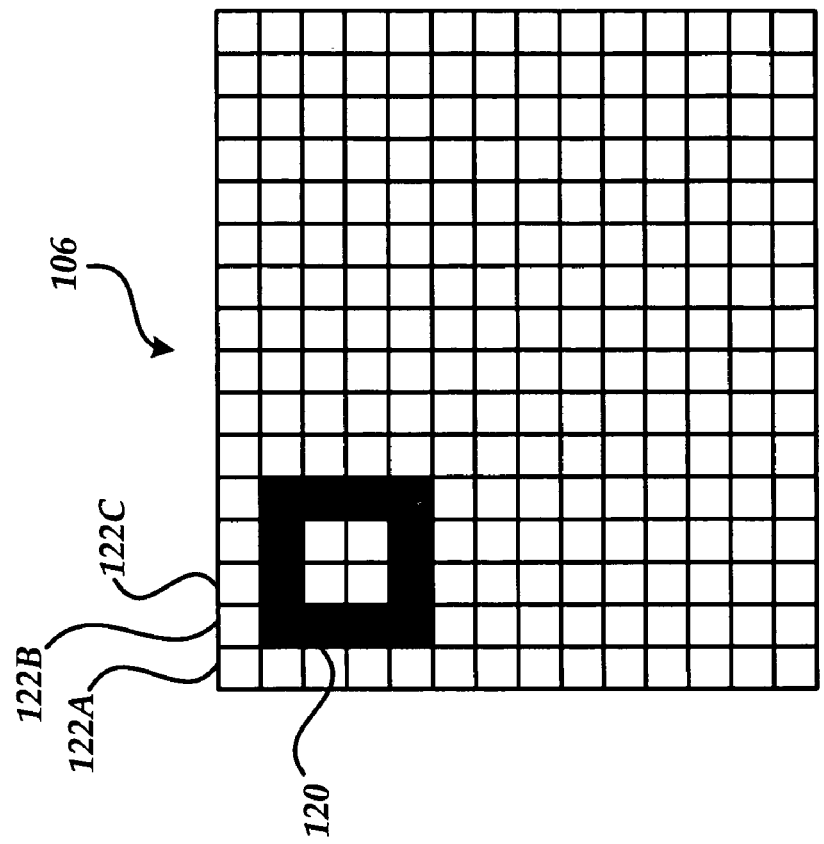
FIGS. 3A–3B are block diagrams illustrating the effects of displaying an identical object on two different displays having different pixel densities utilizing prior art methods.
Figure 3A:
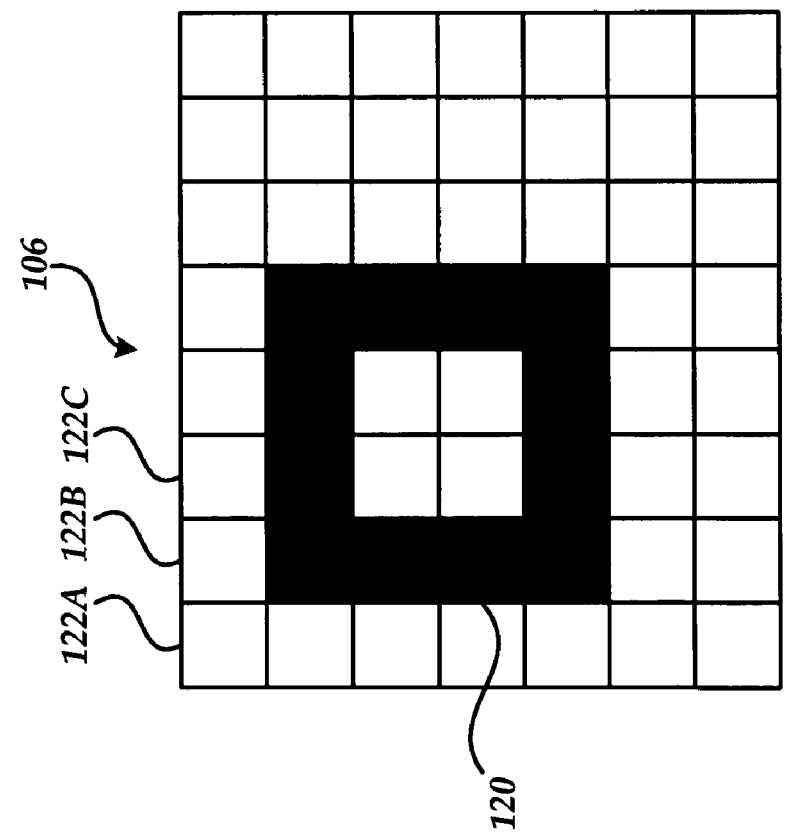

Referring now to FIGS. 3A and 3B, additional details will be provided regarding the displays 106 utilized in the embodiments of the invention. FIG. 3A shows a screen view of a display having a 96 dpi pixel density. As shown in FIG. 3A, the screen is made up of a number of pixels 122A–122C. Each of the pixels may be individually addressed to write data to the display screen. For example, as shown in FIG. 3A, a square 120 may be displayed on the display screen by activating the appropriate pixels.

FIG. 3B illustrates a display screen 106 having a pixel density of 192 dpi, or twice the pixel density of the display screen illustrated in FIG. 3A. FIG. 3B also illustrates drawing the same square 120 that is shown in FIG. 3A. Even though the number of pixels utilized to draw the square 120 is the same, the square 120 illustrated in FIG. 3B is one-quarter the size of the square illustrated in FIG. 3A due to the increased pixel density. This would occur, for instance, when an application program written specifically for operation with a screen having a lower pixel density (as illustrated in FIG. 3A) is executed on a device having a display screen with a higher pixel density (as illustrated in FIG. 3B). Embodiments of the invention will cause the square 120, or any other on-screen object, to be displayed on the display 120 shown in FIG. 3B in the same manner as the square 120 shown in FIG. 3A.

Figure 4B:
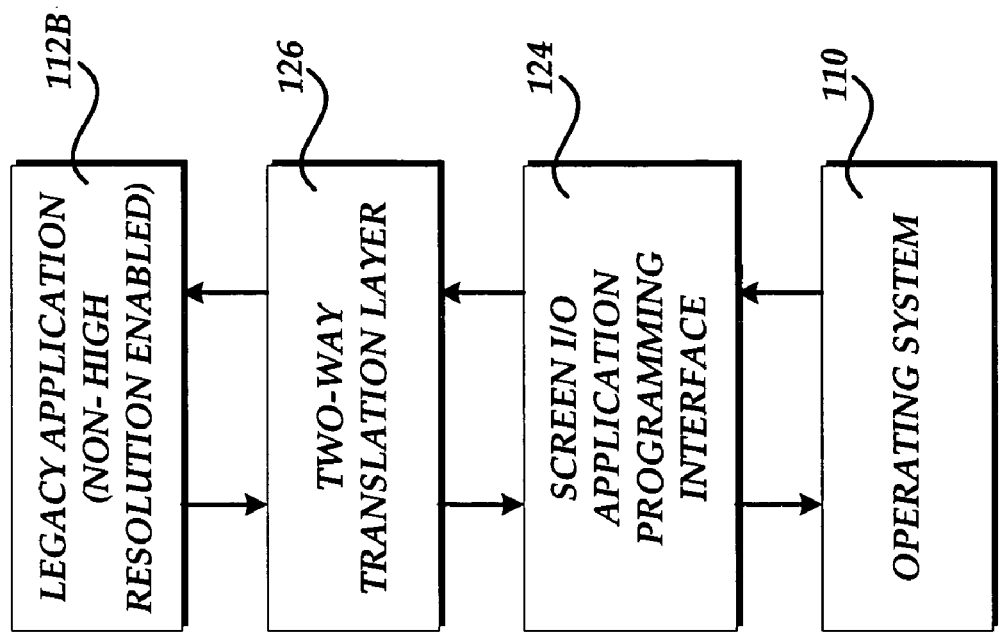
FIGS. 4A–4B are software architectures utilized by the various embodiments of the present invention to ensure application program compatibility with display devices having improved pixel density.
Figure 4A:
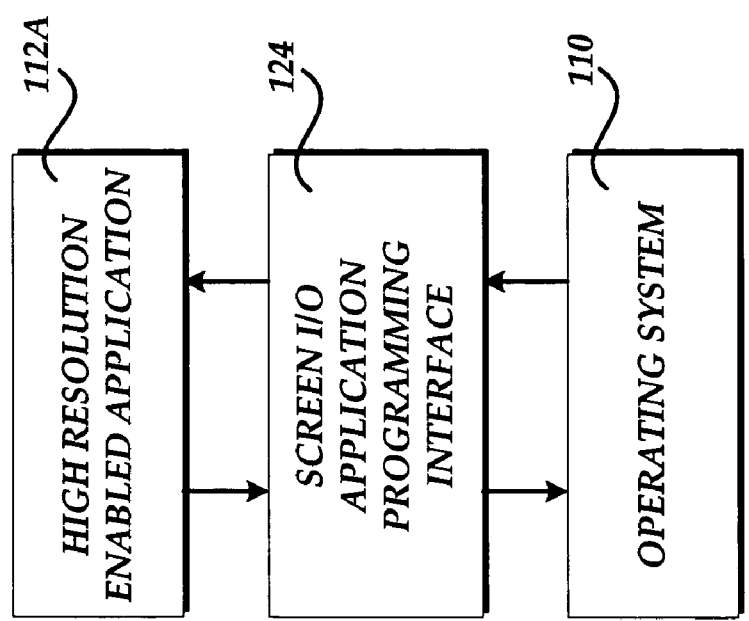

Turning now to FIGS. 4A and 4B, several of the software components utilized to enable application program compatibility with display devices having an increased pixel density will be described. In particular, FIG. 4A illustrates the software components utilized to process calls to APIs for performing display screen I/O by an application program 112A that has been programmed specifically for use with a device having a higher pixel density display. Because the application program 112A has been specifically configured for use with a higher pixel density display, calls to and from the API 124 can be made directly and processed by the operating system 110 without any additional processing.

As will be described in greater detail below, however, a determination can be made when an API call is received as to whether the calling application is specifically configured for use with a display device having a higher pixel density. If the application is configured for use with a display device having a higher pixel density, no additional processing is necessary to enable compatibility with the higher pixel density display as described above. However, if the application is not programmed specifically for use with a display having a higher pixel density, additional processing is necessary to ensure that the input and output is compatible with the higher density display. This is illustrated in FIG. 4B.

Figure 5:
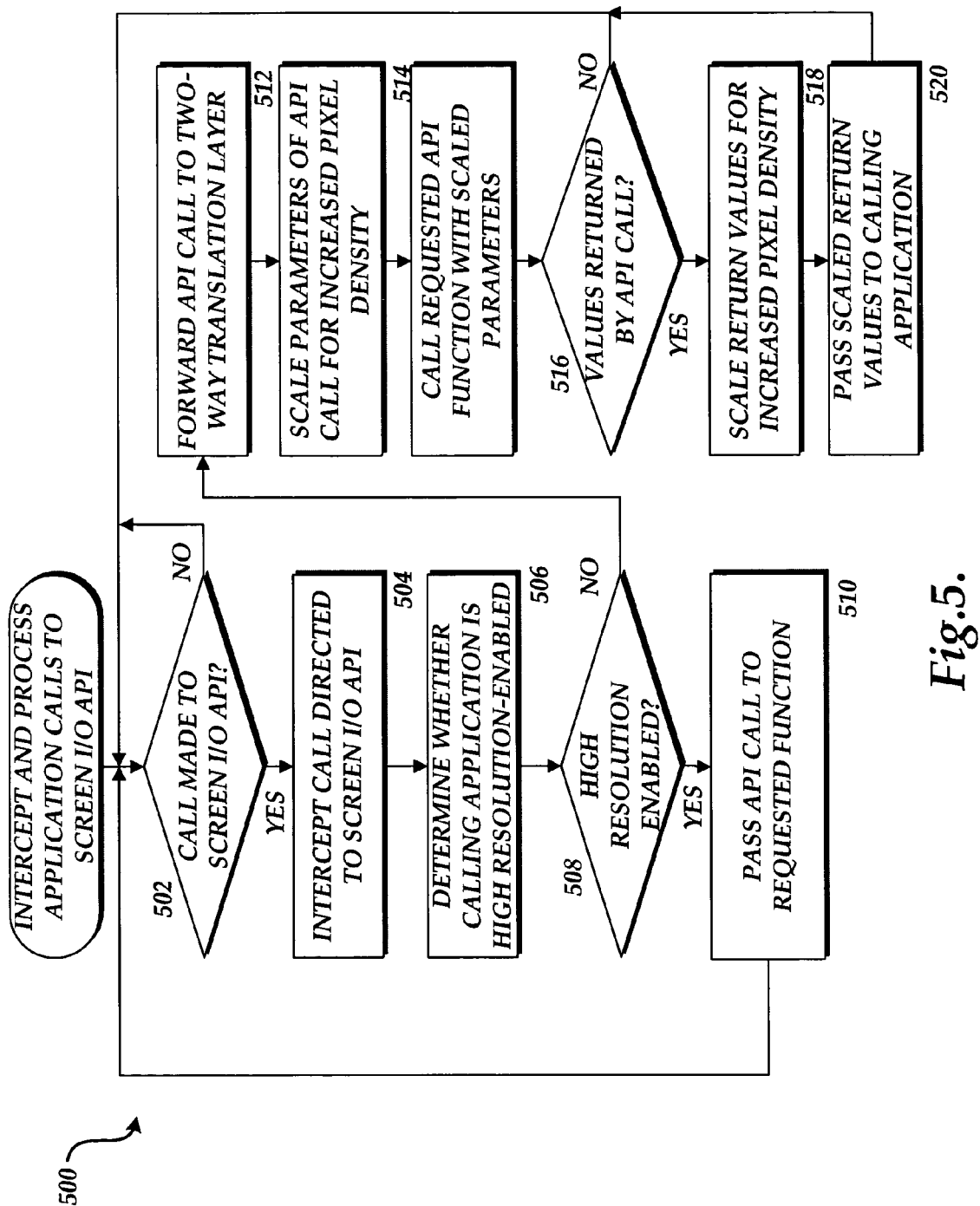
FIG. 5 is a flow diagram illustrating logical operations performed by an illustrative method for ensuring application compatibility with display devices having improved pixel density according to one embodiment of the invention.

As shown in FIG. 4B, a legacy application 112B that is not configured for use with a higher pixel density display device may call an API 124 to perform a screen input or output operation. The two-way translation layer 126 intercepts the API call and determines whether the application program is configured for use with the higher density display device. Since the legacy application 112B is not configured for use with a higher density display device, the translation layer scales the pixel parameters of the API call to the higher pixel density display. For instance, if the legacy application 112B was configured for use with a 96 dpi display and the handheld device 100 actually had a 192 dpi display installed, the translation layer 126 would double the pixel coordinates received with the API call. The translation layer 126 then calls the intended API 124 with the scaled parameters to perform the requested operation at the higher pixel density. Similarly, if parameters are returned from the API 124, such as when an input operation is performed, the return parameters may also be scaled appropriately. It should be appreciated that the API 124 shown in FIGS. 4A and 4B are identical and that no changes need to be made to the API 124. FIG. 5 and its associated discussion provides additional details regarding the process performed by the translation layer 126 for intercepting API calls and scaling the received parameters.

Referring now to FIG. 5, an illustrative routine 500 will be described showing a process for enabling application program compatibility with display devices having an increased pixel density. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims attached hereto.

The routine 500 begins at operation 502, where the translation layer 126 determines whether a call has been received from an application program 112 directed toward an API 124 for performing screen input or output. If such a call has not been received, the routine 500 branches back to operation 502, where another such determination is made. If a call has been made from an application program 112 to the API 124, the routine 500 continues from operation 502 to operation 504.

At operation 504, the translation layer 126 intercepts the API call from the application 112. This may be accomplished for instance, by substituting the address of the translation layer 126 for each of the screen API 124 calls in an address table. In this manner, calls to screen API 124 functions are directed instead to the translation layer 126. The routine then continues from operation 504 to operation 506

At operation 506, the translation layer 126 determines whether the calling application program is configured for use with an increased pixel density display. The translation layer may perform this process, for instance, by examining a property of the application program 112 to determine a software development kit ("SDK") version number against which the application program 112 was compiled. This information may be included with the application program 112 at compile time. Based on the version number of the SDK, the translation layer 126 can determine whether the application program 112 is configured for use with a display device having a lower pixel density or for use with a display device having a higher pixel density. Application programs having version numbers greater than or equal to a predetermined number are assumed to support displays having a higher pixel density. Application programs having version numbers lower than the predetermined number are assumed to support only displays having a lower pixel density. Other methods may also be utilized to determine whether the application program 112 is configured for use with a display device having a higher pixel density.

From operation 506, the routine 500 continues to decision operation 508, where a branch is made depending upon whether the application program 112 is configured for use with a higher or lower pixel density display device. If the application program 112 is configured for use with a display having a higher pixel density, the routine 500 continues to operation 510, where the API call is passed to the intended API without any modification to the passed parameters. Because the application program 112 has been specifically configured for use with a higher pixel density display, calls to and from the API 124 can be made directly and processed by the operating system 110 without any additional processing. From operation 510, the routine 500 returns to operation 502, where additional API calls may be processed.

If, at decision operation 508, it is determined that the calling application 112 is not configured for use with a display having a higher pixel density, the routine 500 branches from decision operation 508 to operation 512. At operation 512, the API call is intercepted by the two-way translation layer 126. At operation 514, the two-way translation layer 126 scales the pixel parameters received with the API call to the higher pixel density display device. Then, at operation 514, the translation layer 126 calls the intended API with the scaled parameters. The API 124 then performs the intended function with the scaled parameters on the higher pixel density display device.

From operation 514, the routine 500 continues to operation 516, where the translation layer 126 determines whether any pixel values are to be returned to the calling application 112 by the API 124, such as for instance when an input operation is performed. If no pixel values are to be returned to the application 112, the routine 500 returns to operation 502, where another API call may be intercepted and processed. If values are to be returned, the routine 500 continues to operation 518, where the translation layer scales the returned pixel values to the pixel density of the lower pixel density display. The routine 500 then continues to operation 520, where the scaled return values are returned by the translation layer to the application 112. The routine 500 then returns to operation 502, where another API call may be intercepted and processed.

It should be appreciated that although the embodiments of the invention described herein are presented in the context of a handheld computing device, the various aspects of the invention may be utilized with desktop, laptop, and other types of computer systems to ensure backward compatibility with higher pixel density displays. Moreover, also the embodiments of the present invention are described in the context of scaling parameters from a lower pixel density to a higher pixel density, the invention may also be utilized to scale higher pixel densities to lower pixel densities. In this manner, application programs configured only for use with a display having a higher pixel density may be utilized without modification on a display screen having a lower pixel density.

Based on the foregoing, it should be appreciated that the various embodiments of the invention include a method, system, apparatus, and computer-readable medium for enabling application program compatibility with display devices having an increased pixel density. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for enabling an application program configured for use with a display device having a lower pixel density to utilize a display device having a higher pixel density, the method comprising:

receiving from an application program a call directed toward an application programming interface for performing a screen input or output function, the call including one or more parameters;

in response to receiving the call, determining whether the application program is configured for use with the display device having one of the following: a lower pixel density and a higher pixel density, wherein determining whether the application program is configured for use comprises;

examining a property of the application program to determine a software development kit version number against which the application program was compiled wherein the version number corresponds to a pixel density support level of the application program, and determining that the application program is configured for use with the display device having the higher pixel density if the version number is one of the following: greater than a predetermined value and equal to the predetermined value, and determining that the application program is configured for use with the display device having the lower pixel density if the version number is less than the predetermined value; and in response to determining that the application program is configured for use with the display device having the lower pixel density, scaling the parameters for the higher pixel density display device, and calling the application programming interface with the scaled parameters.

2. The method of claim 1, further comprising in response to determining that the application program is configured for use with the display device having the lower pixel density, receiving one or more return parameters from the application programming interface, scaling the return parameters for the lower pixel density display device, and returning the scaled return parameters to the application program.

3. The method of claim 2, wherein the lower pixel density display device has a pixel density of 96 dots per inch.

4. The method of claim 3, wherein the higher pixel density display device has a pixel density of 192 dots per inch.

5. A computer-readable storage medium having computer-executable instructions stored thereon which, when executed by a computer, will cause the computer to perform the method of claim 1.

6. A computer-controlled apparatus capable of performing the method of claim 1.

7. A computer system configured to enable an application program created for use with a display device having a lower pixel density to utilize a display device having a higher pixel density, the computer system comprising:

a central processing unit;

a display device having a higher pixel density; and a memory operative to store, an operating system for execution on the central processing unit, an application program for execution on the operating system and created for use with a display device having a lower pixel density, an application programming interface for performing input and output operations to the display device, and a translation layer for intercepting calls by the application program to the application programming interface, for scaling the calls to the display device, and for calling the application programming interface with the scaled parameters wherein the translation layer is further operative to determine whether the application program is configured for use with the display device having a higher pixel density comprising, examining a property of the application program to determine a software development kit version number against which the application program was compiled wherein the version number corresponds to a pixel density support level of the application program, determining that the application program is configured for use with the display device having the higher pixel density if the version number is greater than or equal to a predetermined value, and determining that the application program is configured for use with the display device having the lower pixel density if the version number is less than the predetermined value.

8. The computer system of claim 7, wherein the translation layer is further operative to determine whether the application program is configured for use with the display device having a higher pixel density and to call the application programming interface without scaling the parameters in response to determining that the application program is configured for use with the display device having a higher pixel density.

9. The computer system of claim 8, wherein the display device having a higher pixel density has a pixel density of 192 dpi and wherein the application program created for use with a display device having a lower pixel density is configured for use with a display device having a 96 dpi pixel density.

10. The computer system of claim 9, wherein the translation layer is further operative to receive one or more return parameters from the application programming interface, to scale the return parameters for the lower pixel density display device, and to return the scaled return parameters to the application program created for use with a display device having a lower pixel density.

11. A method for enabling an application program configured for use with a display device having a lower pixel density to utilize a display device having a higher pixel density, the method comprising:

receiving from an application program a call directed toward an application programming interface for performing a screen input or output function, the call including one or more parameters;

in response to receiving the call, determining whether the application program is configured for use with the display device having the lower pixel density or the display device having a higher pixel density by:

examining a property of the application program that specifies a software development kit version number against which the application program was compiled wherein the version number corresponds to a pixel density support level of the application program, and determining whether the application program is configured for use with the display device having the lower pixel density or the display device having a higher pixel density based on the version number, wherein:

determining that the application program is configured for use with the display device having the higher pixel density if the version number is greater than or equal to a predetermined value, and determining that the application program is configured for use with the display device having the lower pixel density if the version number is less than the predetermined value;

in response to determining that the application program is configured for use with the display device having the lower pixel density, scaling the parameters for the higher pixel density display device and calling the application programming interface with the scaled parameters; and calling the application programming interface without scaling the parameters in response to determining that the application program is configured for use with the display device having a higher pixel density.

12. The method of claim 11, further comprising in response to determining that the application program is configured for use with the display device having the lower pixel density, receiving one or more return parameters from the application programming interface, scaling the return parameters for the lower pixel density display device, and returning the scaled return parameters to the application program.

13. The method of claim 12 wherein the lower pixel density display device has a pixel density of 96 dots per inch.

14. The method of claim 13, wherein the higher pixel density display device has a pixel density of 192 dots per inch.

15. A computer-readable storage medium having computer-executable instructions stored thereon which, when executed by a computer, will cause the computer to perform the method of claim 11.

16. A computer-controlled apparatus capable of performing the method of claim 11.

* * * * *